United States Patent [19]
Kinoshita et al.

[11] Patent Number: 6,001,301
[45] Date of Patent: *Dec. 14, 1999

[54] METHOD OF MOLDING A LAMINA INTO A PROTECTIVE MEMBER

[75] Inventors: Ryouichi Kinoshita; Masaaki Noma, both of Fukuyama, Japan

[73] Assignee: Hayakawa Rubber Company Limited, Fukuyama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/648,652

[22] Filed: May 15, 1996

[51] Int. Cl.⁶ .................................................. B29C 33/00

[52] U.S. Cl. ........................... 264/510; 264/512; 118/505

[58] Field of Search ................................. 428/40.1, 317.3, 428/36.5; 156/60; 118/505; 150/154, 155, 158, 165; 264/512, 510, 173.15, 241

[56] References Cited

U.S. PATENT DOCUMENTS

| | | | |
|---|---|---|---|
| 3,922,408 | 11/1975 | Smith | 428/40.1 |
| 4,822,650 | 4/1989 | Horiki et al. | 428/34.2 |

FOREIGN PATENT DOCUMENTS

| | | | |
|---|---|---|---|
| 0483946 A1 | 5/1992 | European Pat. Off. | 118/505 |

*Primary Examiner*—Jeff H. Aftergut
*Assistant Examiner*—R. Hendrix
*Attorney, Agent, or Firm*—Baker & Botts, L.L.P.

[57] ABSTRACT

A pre-shaped protective member has, on one side or both sides thereof, a uniform adhesive layer covered with a release film. This protective member is produced by vacuum-molding or pressure-molding a molding laminate comprising a thermoplastic sheet with or without a foamed sheet laminated thereon as a base sheet, an adhesive layer having a thickness of 0.5 mm or more and laminated on at least one surface of the base sheet, and a release film covering the adhesive layer.

6 Claims, 6 Drawing Sheets

FIG_3

FIG_4

FIG_7

FIG_8

FIG_9

FIG_10

FIG_11

FIG_12

FIG_13

METHOD OF MOLDING A LAMINA INTO A PROTECTIVE MEMBER

BACKGROUND OF THE INVENTION

1. Technical Field

This invention relates to a protective member usable in the technical fields of architecture and civil engineering, which is pre-shaped so that it can surely and easily provide a deformed portion with watertightness, corrosion resistance and a water cut-off function.

2. Background Art

Conventionally, watertightening, corrosion protection and water cut-off for a deformed portion have been conducted by cutting a sheet at the construction site in accordance with the shape of the deformed portion, and then pasting the thus-cut piece to the deformed portion and caulking it, by filling a difference level portion with putty, by applying a non-adhesive shaped body to the deformed portion with use of an adhesive at the site, or by using a partly-adhesive shaped body, However, the conventional protective member obtained by one of the above methods, wherein a sheet is cut and pasted at the construction site to be followed by caulking, tends to suffer such problems that there is leak of water due to the unevenness of works, and that because of difference level caused by overlapping of two or three sheets, the protective member is so unstable as to take in a layer of air, thereby resulting in insufficient airtightness and liquid-tightness. In the method wherein a difference level portion is filled with putty, it sometimes requires a large quantity of putty, thereby increasing the cost of materials as well as of the working hours. In the case of a non-adhesive shaped body, it is necessary to apply an adhesive at the construction site and some kinds of adhesive may cause unevenness of works which result in insufficient airtightness, liquid-tightness and durability. This means that such conventional members have problems in view of safety and stability.

Even in the case of a partly-adhesive shaped body, there has been such a problem that difference in thickness of adhesive layer allows entering of air, thereby failing to attain sufficient sealing as well as sufficient corrosion resistance.

DISCLOSURE OF INVENTION

An object of the present invention is to solve the above-mentioned problems involved in the conventional protective members and to attain such an object, a pre-shaped protective member according to the present invention has, on at least one surface thereof, a uniform adhesive layer covered with a release film, which protective member being produced by shaping a molding laminate composed of a thermoplastic sheet, an adhesive layer having a thickness of 0.5 mm or more and laminated on at least one surface of the thermoplastic sheet, and a release film covering the adhesive layer. The protective member may also be made of a molding laminate composed of a thermoplastic sheet, a foamed sheet laminated thereon, an adhesive layer having a thickness of 0.5 mm or more and applied to at least one surface of the laminated sheets, and a release film covering the adhesive layer. The protective member of the present invention is shaped by vacuum molding or pressure molding.

With this composition, since one or both surfaces of the shaped body are provided with an adhesive layer covered with a release film, the protective member can be easily attached onto a desired site by only removing the release film and pressing the adhesive layer against the desired site. In addition, since the adhesive layer has a uniform thickness and a smooth surface, the protective member can have a very tight contact with the site to which it has been attached. This means that entering of air hardly happens in this case. Moreover, unevenness of products can be reduced because the adhesive layer of the present invention is also a factory product, which is required to pass a production check.

BRIEF DESCRIPTION OF DRAWINGS

The present invention will be explained in further detail with reference to the attached drawings.

DESCRIPTION OF THE PREFERRED EMBODIMENTS

The present invention will be hereinafter explained in further detail referring to the following embodiments.

Figure 1:
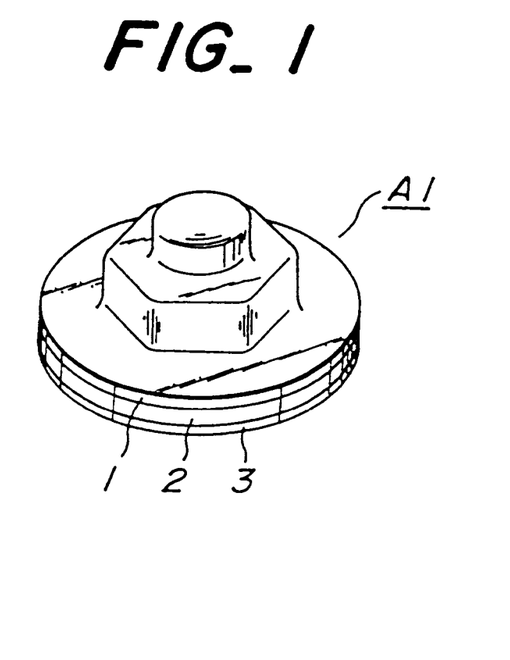
FIG. 1 is a perspective view showing a protective member as a first embodiment of the present invention.
Figure 11:
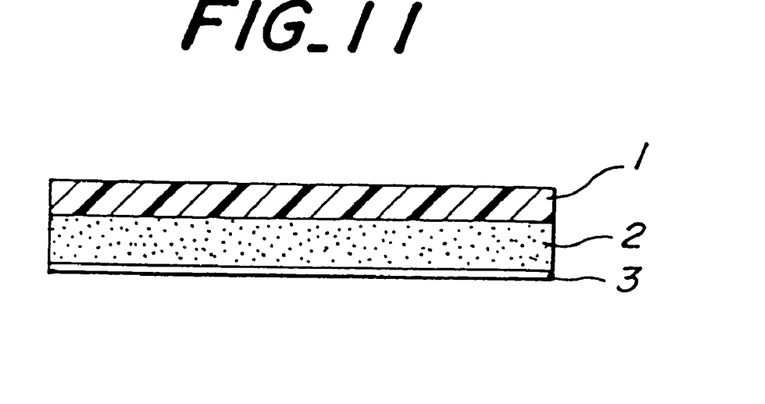
FIG. 11 is a cross-sectional view illustrating an example of a molding laminate used for the protective member of the present invention.

Referring to FIG. 1, there is shown a protective member for corrosion protection of bolt/nut portion as a first embodiment of the protective member according to the present invention. This protective member $A_1$ is used for corrosion protection of a bolt/nut portion in various plant facilities and equipment. A molding laminate usable for this protective member $A_1$ has, for example, a constitution shown in a cross-sectional view of FIG. 11. A material for a thermoplastic sheet 1, which functions as a base sheet, is required to have a protective property and polyethylene is used in view of corrosion resistance properties such as chemical resistance, electrical insulation, etc. The thermoplastic sheet 1 may preferably have a thickness of about 1.0 mm. With respect to a thickness of an adhesive layer 2, it is necessary to be 0.5 mm or more and may preferably be about 1.5 mm in order to secure thorough absorption of surface roughness as well as adhesion to a member to be protected so that the resulting protective member can attain good performance in corrosion protection. A release film 3 is used to protectively cover the adhesive layer 2, and should be smoothly removed therefrom when the protective member is used. A thickness of the release film 3 may preferably be 80–150 μm; and the larger the molding depth of the aimed protective member, the thicker the adhesive layer used therefor. A molding laminate having the above-described composition is heated from both upper and lower sides by using a far infrared ray heater with a surface temperature of 300° C. at a distance of 7 cm for 75 seconds, and then shaped by vacuum molding from the side of release film with use of a pattern corresponding to the contour of the engaged bolt and nut to be protected. After trimming off unnecessary portions, there can be obtained a pre-shaped protective member $A_1$ having a uniform adhesive layer on the inner surface thereof, which adhesive layer being protectively covered with a release film.

Figure 2:
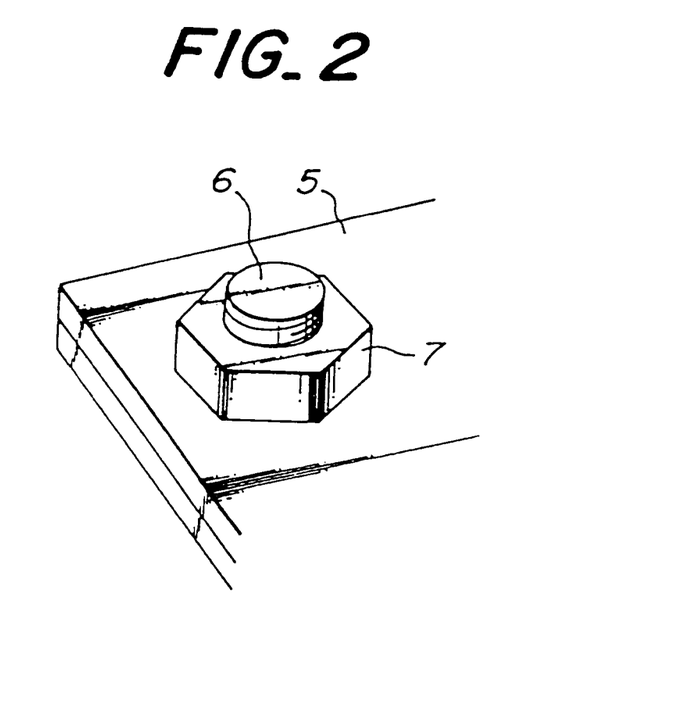
FIG. 2 is a perspective view illustrating a member to be protected by the protective member shown in FIG. 1.

When the thus-obtained protective member is actually used, the release film 3 is removed from the protective member $A_1$, which has been shaped in advance by vacuum molding in accordance with the contour of the engaged bolt and nut, on an actual construction site and then, the protective member is fitted and pressed onto the engaged bolt 6 and nut 7 shown in FIG. 2. Accordingly, the adhesive layer 2 is tightly adhered to a plate 5 as well as the bolt 6 and nut 7. As a result, the protective member $A_1$ shuts off gaps between the bolt 6, nut 7 and plate 5 from the outside world, thereby protecting those members from corrosion.

When compared with the conventional method wherein gaps are filled with putty and a sheet cut on the spot is pasted to the portion to be protected, the protective member of the present invention has better workability and moreover, it can surely perform the corrosion protecting function without being affected by the skill of a construction worker.

Figure 3:
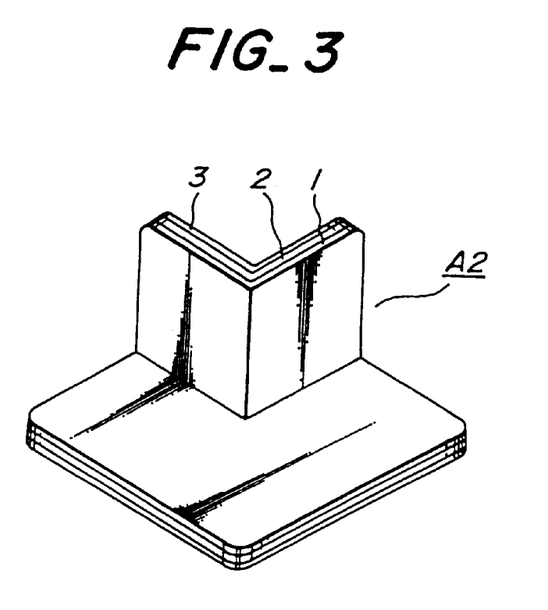
FIG. 3 is a perspective view showing a protective member as a second embodiment of the present invention.

Next, an explanation will be made on a second embodiment of the present invention. Referring to a perspective view of FIG. 3, there is shown a protective member for an external angle part as a second embodiment of present invention. This protective member $A_2$ is used to waterproof a corner of an external angle part of building. A molding laminate usable for this protective member $A_2$ has, for example, a constitution shown in a cross-sectional view of FIG. 11. As a material for a thermoplastic sheet 1, which functions as a base sheet, a thin and flexible material is desirable when workability during the application thereof is regarded as important. Accordingly, EVA is used in this case, and the thickness thereof may preferably be about 0.6 mm. Polyethylene or rigid polyvinyl chloride is also used in the case where a protective property is considered to be more important. With respect to a thickness of an adhesive layer 2, it is necessary to be 0.5 mm or more and may preferably be about 1.5 mm in order to secure thorough absorption of surface roughness, adhesion to a member to be protected as well as waterproofing performance. A release film 3 is used to protectively cover the adhesive layer 2, and should be smoothly removed therefrom when the protective member is actually used. A thickness of the release film 3 may preferably be 80–150 μm; and the larger the molding depth of the aimed protective member, the thicker the adhesive layer used therefore. When a thermoplastic sheet of EVA having a thickness of 0.6 mm is used, a molding laminate comprising such thermoplastic sheet is heated from both upper and lower sides thereof by using a far infrared ray heater with a surface temperature of 300° C. at a distance of 7 cm for 70 seconds, and then shaped by vacuum molding from the side of release film with use of a pattern corresponding to the shape of external angle part to be protected. After trimming off unnecessary portions, there can be obtained a pre-shaped protective member $A_2$ having a uniform adhesive layer on the inner surface thereof, which adhesive layer being protectively covered with a release film.

Figure 4:
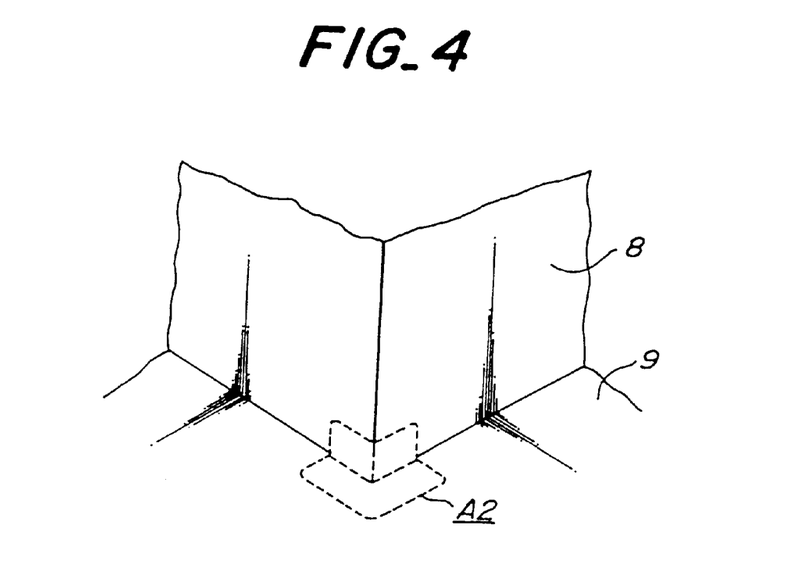
FIG. 4 is a perspective view depicting a portion to be protected by the protective member shown in FIG. 3.

When the thus-obtained protective member $A_2$ is actually used, the release film 3 is removed therefrom and the protective member is fitted and pressed onto the corner of the external angle part to be protected. Consequently, the adhesive layer 2 is tightly adhered to a wall 8 and floor 9 as illustrated by the broken line in FIG. 4. Accordingly, the protective member $A_2$ can have excellent workability and surely perform the waterproofing function without being affected by the skill of a construction worker, since it has a more uniform adhesive layer on its inner surface when compared with the conventional methods wherein an adhesive is applied to a protective member on the actual construction site, caulking is conducted after cutting and pasting a sheet, or an adhesive is applied to a protective member by hand.

Figure 5:
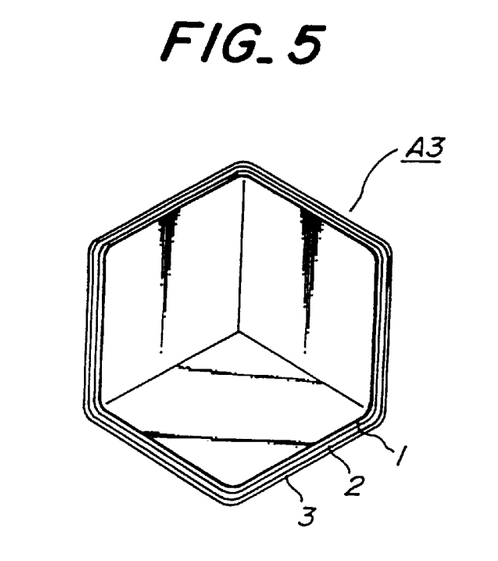
FIG. 5 is a perspective view illustrating a protective member as a third embodiment of the present invention.

Now, an explanation will be made on a third embodiment of the present invention. Referring to a perspective view of FIG. 5, there is shown a protective member for an internal angle part as a third embodiment of present invention. This protective member $A_3$ is used to waterproof a corner of an internal angle part of building. A molding laminate usable for this protective member $A_3$ has, for example, a constitution shown in a cross-sectional view of FIG. 11. As a material for a thermoplastic sheet 1, which functions as a base sheet, a thin and flexible material is desirable when workability during the application thereof is regarded as important. Accordingly, EVA is used in this case, and the thickness thereof may preferably be about 0.6 mm. Polyethylene or rigid polyvinyl chloride is also used in the case where protective property is considered to be more important. With respect to a thickness of an adhesive layer 2, it is necessary to be 0.5 mm or more and may preferably be about 1.5 mm in order to secure thorough absorption of surface roughness, adhesion to a member to be protected as well as waterproofing performance. A release film 3 is used to protectively cover the adhesive layer 2, and should be smoothly removed therefrom when the protective member is actually used. A thickness of the release film 3 may preferably be 80–150 μm, and the larger the molding depth of the aimed protective member, the thicker the adhesive layer used therefore. When a thermoplastic sheet of EVA having a thickness of 0.6 mm is used, a molding laminate comprising such thermoplastic sheet is heated from both upper and lower sides thereof by using a far infrared ray heater with a surface temperature of 300° C. at a distance of 7 cm for 70 seconds, and then shaped by vacuum molding from the side of release film with use of a pattern corresponding to the shape of internal angle part to be protected. After trimming off unnecessary portions, there can be obtained a pre-shaped protective member $A_3$ having a uniform adhesive layer on the inner surface thereof, which adhesive layer being protectively covered with a release film.

Figure 6:
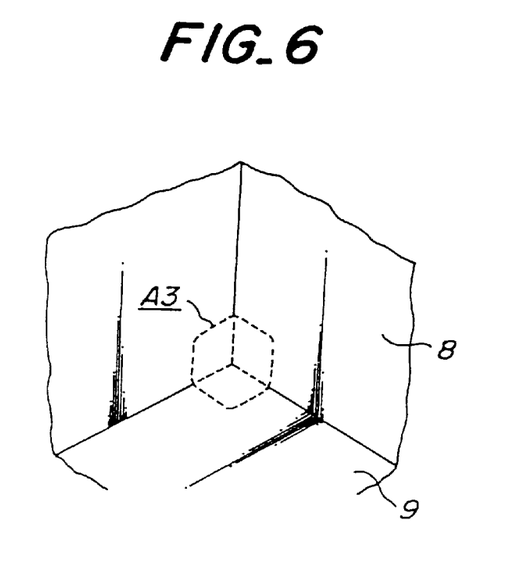
FIG. 6 is a perspective view depicting a portion to be protected by the protective member shown in FIG. 5.

When the thus-obtained protective member $A_3$ is actually used, the release film 3 is removed therefrom and the protective member is fitted and pressed onto the corner of the internal angle part to be protected. Consequently, the adhesive layer 2 is tightly adhered to a wall 8 and floor 9 as illustrated by the broken line in FIG. 6. Accordingly, the protective member $A_3$, which has a more uniform adhesive layer on its inner surface, has attained excellent workability and therefore, can surely perform the waterproofing function without being affected by the skill of a construction worker when compared with the conventional methods wherein an adhesive is applied to a protective member on the actual construction site, caulking is conducted after cutting and pasting a sheet, or an adhesive is applied to a protective member by hand.

Figure 12:
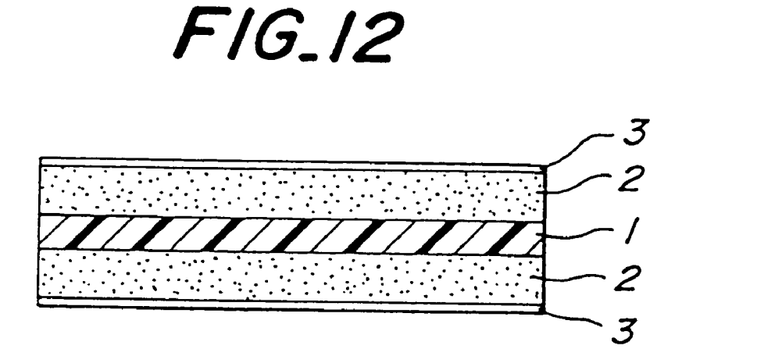
FIG. 12 is a cross-sectional view illustrating another example of a molding laminate used for the protective member of the present invention.

Next, an explanation will be made on a fourth embodiment of the present invention. Referring to a perspective view of FIG. 7, there is shown a protective member for a separator as a fourth embodiment of the present invention. This protective member $A_4$ is used to prevent a leak of water through a separator portion of a concrete joint. A molding laminate usable for this protective member $A_4$ has, for example, a constitution shown in a cross-sectional view of FIG. 12. As a material for a thermoplastic sheet 1, which functions as a base sheet, a rigid polyvinyl chloride sheet having a thickness of 0.5 mm is used from the viewpoint of strength. With respect to a thickness of an adhesive layer 2, it is necessary to be 0.5 mm or more and may preferably be about 1.5 mm in order to secure thorough absorption of surface roughness, adhesion to a member to be protected as well as waterproofing performance. A release film 3 is used to protectively cover the adhesive layer 2, and should be smoothly removed therefrom when the protective member is actually used. A thickness of the release film 3 may preferably be 80–150 $\mu$m; and the larger the molding depth of the aimed protective member, the thicker the adhesive layer used therefor.

Figure 7:
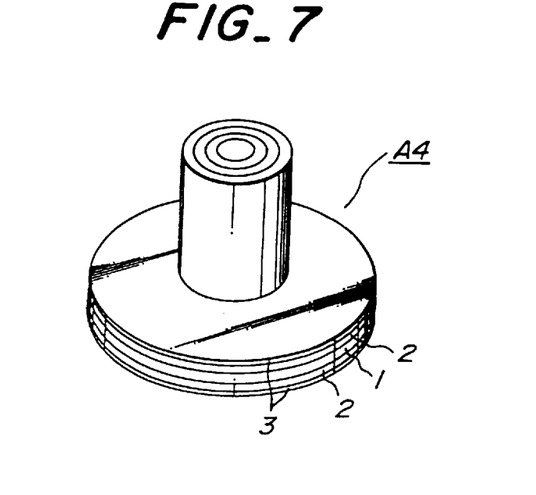
FIG. 7 is a perspective view showing a protective member as a fourth embodiment of the present invention.

When a molding laminate comprises a polyethylene release film (thickness: 100 $\mu$m), an adhesive layer (thickness: 1.5 mm), a rigid polyvinyl chloride sheet (thickness: 0.5 mm), an adhesive layer (thickness: 1.5 mm) and a polyethylene release film (thickness: 100 $\mu$m) laminated in this order, the molding laminate is heated from both upper and lower sides thereof by using a far infrared ray heater with a surface temperature of 280° C. at a distance of 7 cm for 100 seconds, and then shaped by vacuum molding. After trimming off unnecessary portions, there is obtained a pre-shaped protective member $A_4$ having an adhesive layer on both surface thereof, which adhesive layer being respectively protected by a release film. This protective member $A_4$ does not allow water leakage therethrough even when additional concrete is placed thereon after the protective member $A_4$ is applied onto a surface of another already-placed concrete.

Figure 8:
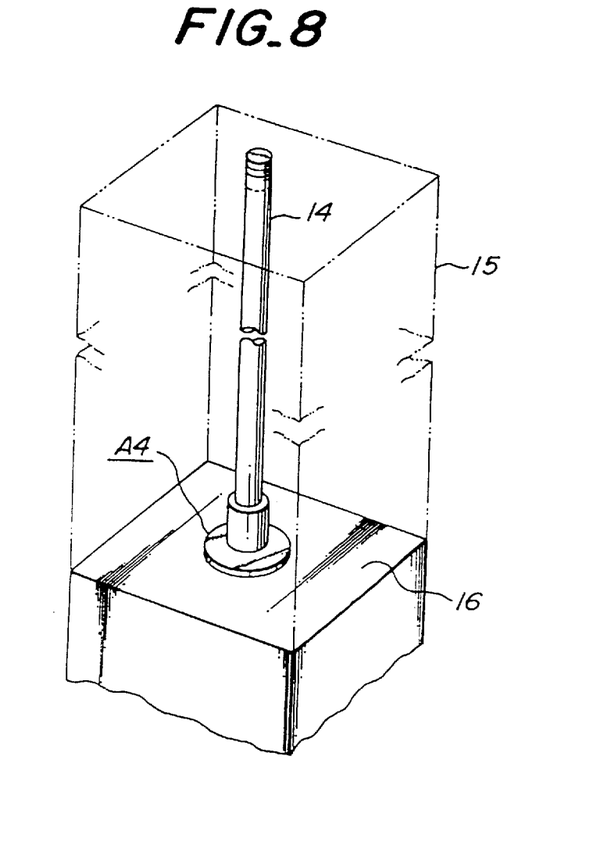
FIG. 8 is a perspective view illustrating a portion to be protected by the protective member shown in FIG. 7.

In the actual arrangement of the protective member $A_4$, an iron rod 14 is embedded in advance in a concrete pillar 16 to be jointed with new concrete pour as shown in FIG. 8. After peeling the release film 3 off from the lower side of the protective member $A_4$, the protective member is arranged and pressed onto the upper surface of the concrete pillar 16, while being penetrated by the iron rod 14. Consequently, the lower adhesive layer 2 of the protective member $A_4$ shown in FIG. 7 is tightly adhered to the upper surface of the concrete pillar 16 as well as the iron rod 14 in FIG. 8. Then, after removing the other release film 3 from the upper side of the protective member $A_4$, a wood frame or the like (not shown) is arranged upwardly on the concrete pillar 16 and fixed to the iron rod 14 by means of nuts or the like. Next, a new concrete is poured into the wood framer so that a new concrete pillar 15 is jointed to the lower concrete pillar 16. In this connection, since the upper surface of the concrete pillar 16 and the iron rod 14 are insulated from each other by the adhesive layer 2 of the protective member $A_4$, water trickling along the iron rod 14 can be cut-off by the protective member $A_4$. Accordingly, when compared with the conventional method wherein a putty-type adhesive is wound around the iron rod, the protective member of the present invention has an improved workability and surely performs the cut-off function without being deformed by the newly poured concrete, since it contains a thermoplastic sheet functioning as a reinforcing material at the center in addition to the adhesive layer 2.

Figure 9:
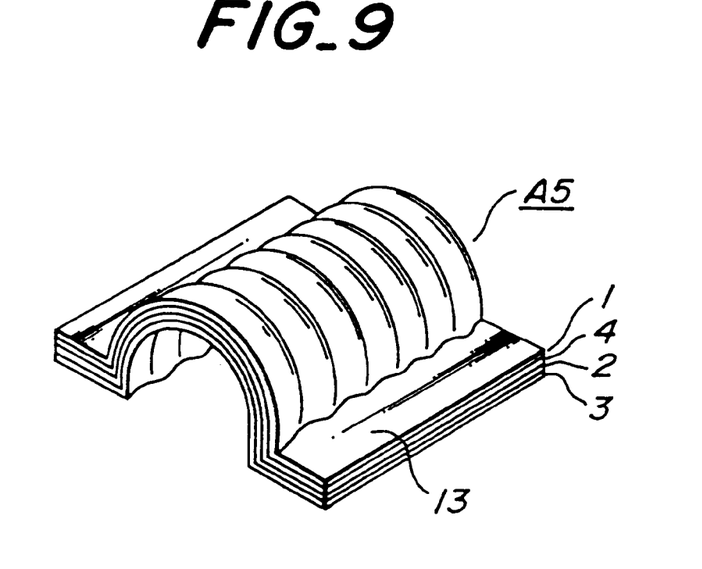
FIG. 9 is a perspective view depicting a protective member as a fifth embodiment of the present invention.
Figure 13:
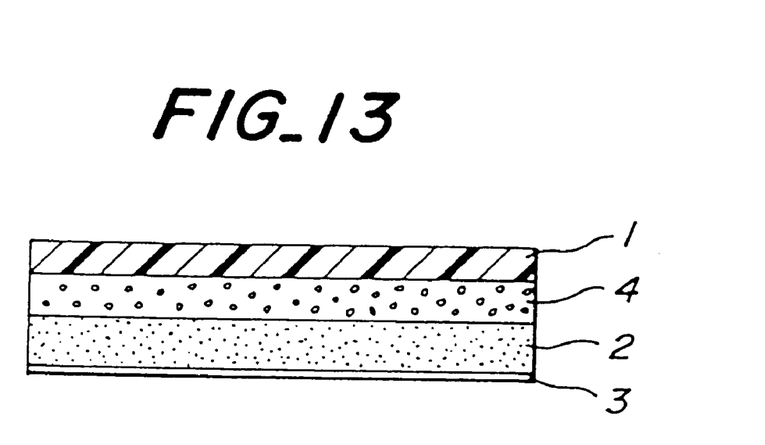
FIG. 13 is a cross-sectional view illustrating a still another example of a molding laminate used for the protective member of the present invention.

Referring to a perspective view of FIG. 9, there is shown a one half of a protective member for a corrugated pipe joint as a fifth embodiment of the present invention. This protective member $A_5$ is used for protecting jointed corrugated pipes, and is shaped in accordance with such corrugated pipes. A molding laminate usable for this protective member As has, for example, a construction shown in a cross-sectional view of FIG. 13. As a material for a thermoplastic sheet 1, which functions as a base sheet, a rigid polyvinyl chloride sheet preferably having a thickness of about 1.0 mm is used, since reinforcing effect is especially required as the protective property. A foamed sheet of the same polyvinyl chloride used for the thermoplastic sheet 1 is used as a foamed sheet 4 with a thickness of 3 mm in view of a size error between the corrugated pipes to be jointed. With respect to a thickness of an adhesive layer 2, it is necessary to be 0.5 mm or more and may preferably be about 1.5 mm in order to secure thorough absorption of surface roughness, adhesion to the corrugated pipes as well as watertightening performance. A release film 3 is used to protectively cover the adhesive layer 2, and should be smoothly removed therefrom when the protective member is actually used. Accordingly, a polyethylene film having a thickness of about 100 $\mu$m is used as the release film.

A molding laminate having the above-described composition is heated from both upper and lower sides by using far infrared ray heaters with a surface temperature of 300° C. at a distance of 3 cm on the upper side and at a distance of 10 cm on the lower side for 90 seconds, and then shaped by vacuum molding from the side of the release film with use of a pattern corresponding to the contour of the corrugated pipes to be protected. After trimming off unnecessary portions, there can be obtained a pre-shaped protective member $A_5$ having a uniform adhesive layer 2 on the inner surface thereof, a release film 3 protectively covering it, a foamed sheet 4 which absorbs size errors between the corrugated pipes to be jointed, and a thermoplastic sheet 1 performing a reinforcing function.

In actual arrangement, two of the protective members $A_5$ shown in FIG. 9 are prepared. After removing the release film 3 of respective protective members $A_5$, which corresponds to the shape of the corrugated pipes to be protected, the two protective members $A_5$ are arranged around a jointed portion of the corrugated pipes 10 and 11 shown in FIG. 10 from the opposite directions, and pressed against each other so that respective flange portions 13 are tightly adhered to each other, thereby constituting one integrated protective member.

Figure 10:
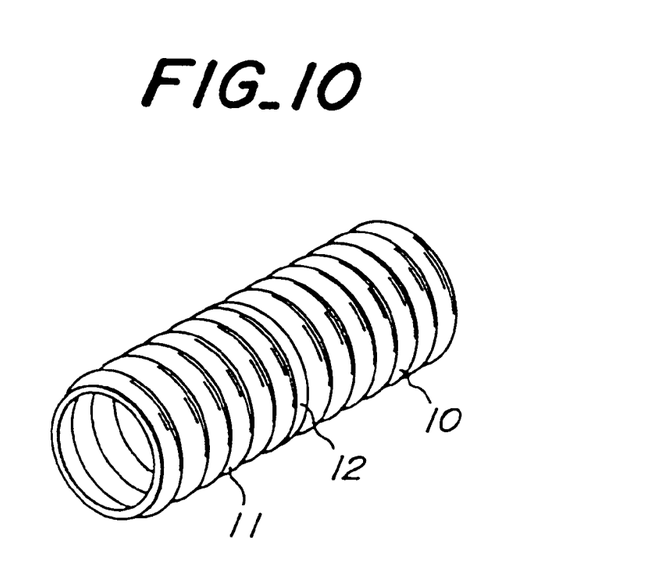
FIG. 10 is a perspective view showing a portion to be protected by the protective member shown in FIG. 9.

In this connection, the foamed sheet 4 absorbs size difference between the corrugated pipes 10 and 11, so that the adhesive layer 2 can be tightly adhere to the corrugated pipes 10 and 11. In addition, since a rather thick adhesive layer compensates a step formed in the jointed portion, the protective member according to this embodiment has an improved workability and surely performs a waterproofing function. Moreover, different from the conventional method wherein a waterproof tape is wound around the jointed corrugated pipes and a separate reinforcing member is required to prevent a bending at the jointed portion, the present protective member can maintain the shape of a jointed portion due to the reinforcing effect of the base material, namely a thermoplastic sheet 1.

Now, explanations will be made on the composition of the respective components constituting the protective member of the present invention.

As a thermoplastic sheet 1 used as the base material for the protective member, a sheet of such materials that exhibit plasticity when heated, namely polyethylene, ethylene vinyl acetate, polypropylene, polyvinyl chloride, polystyrene or the like, is used. The thickness of the sheet 1 is not limited to those mentioned in the above embodiments, and can be appropriately determined depending upon strength and the like that are required for the resulting shaped protective member.

Examples of a base polymer usable for the adhesive layer 2 may include butadiene rubber, nitrile rubber, ethylene propylene terpolymer, silicone rubber, polyisobutylene, styrene-butadiene rubber, styrene-butadiene-styrene block copolymer, styrene-isoprene-styrene block copolymer, natural rubber, isoprene rubber, butyl regenerated rubber, and the like. Among them, butyl regenerated rubber is preferable. As compounds added to the above-mentioned base polymer, a filler such as calcium carbonate, clay, talc, zinc white, cork, carbon black; a softening agent such as liquid rubber, oil; a tackifier such as rosin, petroleum resin; and a pigment and the like are appropriately selected and used in the present invention. It is necessary for the thickness of the adhesive layer 2 to be 0.5 mm or more in order to secure the adhesiveness after molding and absorption of unevenness of a surface to which it is attached. Since it is also necessary for the adhesive layer to uniformly spread over the base material, the adhesive layer may preferably have a thickness of 1–2 mm. Such thickness is also preferable from the view points of adhesiveness, absorption of surface roughness and economy.

In view of workability during the molding as well as uniformity and cohesion of the adhesive layer after molding, the adhesive layer may preferably have a softness of 40–140 in penetration, and a softening point of 90–180° C. When the penetration is less than 40, the adhesive layer hardly sticks to the shaped base sheet after molding. On the other hand, when the penetration is more than 140, the cohesion of adhesive layer after molding is insufficient. When the softening point is lower than 90° C., adhesive flows during the molding, thereby resulting in a layer with uneven thickness. When the softening point is higher than 180° C., moldability of the adhesive layer deteriorates.

The release film 3 is made of a polyethylene film, polypropylene film or the like, which has been subjected to a release treatment with silicon or the like. The thickness of this release film may be determined within a range of 80–150 $\mu$m, depending upon a molding degree so that it is not torn during the molding or removal from the adhesive layer. The foamed sheet 4 is used in such a case when unevenness of a surface, to which the adhesive layer is attached, cannot be absorbed by the adhesive layer alone, or when an impact-cushioning effect is required. A sheet of polyethylene, of polyvinyl chloride or the like may be applicable as such a foamed sheet.

As described above, the protective member of the present invention has, on one side or both sides thereof, a uniform adhesive layer covered with a release film; and this protective member is produced by vacuum molding or pressure molding a molding laminate comprising a thermoplastic sheet with or without a foamed sheet laminated thereon as a base sheet, an adhesive layer having a thickness of 0.5 mm or more and laminated on at least one surface of the base sheet, and a release film covering the adhesive layer. By using such a pre-shaped protective member for waterproofing, corrosive protection and water cut-off of a deformed portion, following excellent effects can be obtained. Namely, since the protective member of the present invention has been molded into a desired shape in advance in factories, it can be used with a stable workability without being affected by the skill of a construction worker. In addition, since the adhesive layer is also formed in advance at the time of molding, the productivity is higher than the cases where an adhesive is applied later, and this leads to a reduction in production costs. The step-free, uniform thickness of adhesive layer results in a high sealing effect; and even when the protective member is used for protection of a member having a complicated shape, entering of air hardly happens as compared with a case where an adhesive is applied later. Moreover, since the adhesive layer has a rather large thickness of 0.5 mm or more, it is enough to absorb unevenness of surfaces of wall, floor or pillar and provide a sufficient sealing thereto. Even in a case where two or more of components are integrated into one protective member on the actual construction site, the jointed portion can attain a sufficient seal due to the rather thick adhesive layer. When a foamed sheet is used, there can be achieved a greater effect in absorption of surface roughness. Since the protective member of the present invention can be attached to a portion to be protected only by removing a release film without applying an adhesive, the workability and working environment thereof are excellent. Because of various advantages described above, the protective member of the present invention has a very good practical use for jointed members requiring airtightness and liquid tightness in technical fields of architecture, civil engineering, machine industry and the like.

Although the invention has been described with reference to specific preferred embodiments, they were given by way of examples only and thus, it should be noted that various changes and modifications may be made on them without departing from the scope of the present invention as defined by the appended claims.

What is claimed is:

1. A method of making a pre-shaped protective member that is adapted to be adhered to an irregularly shaped portion of a construction element by an adhesive layer engageable with substantially the entirety of the irregularly shaped portion to provide environmental protection for said portion, comprising the steps of:

forming a substantially flat laminate that includes in substantially coextensive relation a thermoplastic sheet, a uniform adhesive layer having a thickness of not less than 0.5 mm on at least one surface of the thermoplastic sheet, and a release film covering the adhesive layer;

heating the laminate; and molding the heated laminate to a shape conforming substantially to the shape of the irregularly shaped portion of the construction element so as to provide a molded pre-shaped protective member having an adhesive layer coextensive with the thermoplastic sheet and adapted to be adhered throughout its extent in moisture- and air-tight relation to the irregularly shaped portion.

2. The protective member according to claim 1, wherein the laminate is shaped by vacuum molding.

3. The protective member according to claim 1, wherein the laminate is shaped by pressure molding.

4. A method of making a pre-shaped protective member that is adapted to be adhered to an irregularly shaped portion of a construction element by an adhesive layer engageable with substantially the entirety of the irregularly shaped portion to provide environmental protection for said portion, comprising the steps of:

forming a substantially flat laminate that includes in substantially coextensive relation a thermoplastic sheet, a thermoplastic foam sheet laminated to the thermoplastic sheet, a uniform adhesive layer having a thickness of not less than 0.5 mm on the thermoplastic foam sheet, and a release film covering the adhesive layer;

heating the laminate; and molding the heated laminate to a shape conforming substantially to the shape of the irregularly shaped portion of the construction element so as to provide a molded pre-shaped protective member having an adhesive layer coextensive with the thermoplastic sheet and adapted to be adhered throughout its extent in moisture- and air-tight relation to the irregular shaped portion.

5. The protective member according to claim 4, wherein the laminate is shaped by vacuum molding.

6. The protective member according to claim 4, wherein the laminate is shaped by pressure molding.

* * * * *